(12) United States Patent
Syed et al.

(10) Patent No.: US 12,450,377 B2
(45) Date of Patent: Oct. 21, 2025

(54) MASS SPECTROMETRY DATA MANAGEMENT SYSTEM AND METHOD

(71) Applicants: SMART SENSORS HOLDINGS B.V., Maastricht (NL); CIED B.V., Heerlen (NL)

(72) Inventors: Sarfarazuddin Ahmed Hashmi Syed, Maastricht (NL); Akash Mathew, Heerlen (NL); Sudeesh Narayanan, Heerlen (NL)

(73) Assignees: Smart Sensors Holdings B.V., Maastricht (NL); CIED B.V., Heerlen (NL)

( * ) Notice: Subject to any disclaimer, the term of this patent is extended or adjusted under 35 U.S.C. 154(b) by 292 days.

(21) Appl. No.: 17/926,186

(22) PCT Filed: May 19, 2021

(86) PCT No.: PCT/EP2021/063293
§ 371 (c)(1),
(2) Date: Nov. 18, 2022

(87) PCT Pub. No.: WO2021/234000
PCT Pub. Date: Nov. 25, 2021

(65) Prior Publication Data
US 2023/0195919 A1    Jun. 22, 2023

(30) Foreign Application Priority Data
May 19, 2020   (EP) .................................. 20175456

(51) Int. Cl.
G06F 21/62    (2013.01)
G06F 21/60    (2013.01)
(Continued)

(52) U.S. Cl.
CPC ........ G06F 21/6218 (2013.01); G06F 21/602 (2013.01); H01J 49/0022 (2013.01); H04L 63/105 (2013.01)

(58) Field of Classification Search
CPC ............. G06F 21/62; G06F 21/60; H04L 9/40
See application file for complete search history.

(56) References Cited

U.S. PATENT DOCUMENTS 11,025,626 B1 * 6/2021 Todd .................... H04L 9/3239
11,238,170 B2 * 2/2022 Murdoch .............. H04L 9/3236
(Continued)

*Primary Examiner* — Viral S Lakhia
(74) *Attorney, Agent, or Firm* — Hudak, Shunk & Farine Co. LPA

(57) ABSTRACT

A portable mass spectrometer data assessment system including a portable mass spectrometer that is configured to acquire measurement results of a sample, a first computing device that is connected to the mass spectrometer for retrieving the measurement results from the mass spectrometer in real time, and a central server unit that is connected to a first group of nodes through the internet. The first computing device defines a first node in the first group of nodes when the device is connected to the internet. The first node serves to convert the measurement results into decentralized data. The first node is configured to publish the decentralized data in the first group of nodes. The first group of nodes is configured to publish the decentralized data in the central server unit instantaneously.

19 Claims, 2 Drawing Sheets

(51) Int. Cl.
 *H01J 49/00* (2006.01)
 *H04L 9/40* (2022.01)

(56) References Cited

U.S. PATENT DOCUMENTS

| | | | | |
|---|---|---|---|---|
| 11,251,977 | B2* | 2/2022 | Murdoch | G06F 21/64 |
| 11,509,459 | B2* | 11/2022 | Xu | H04L 63/12 |
| 11,769,577 | B1* | 9/2023 | Dods | G16H 20/10 |
| | | | | 705/50 |
| 11,870,847 | B2* | 1/2024 | Todd | G06F 16/27 |
| 12,190,261 | B2* | 1/2025 | Daoust | G06Q 10/06313 |
| 2011/0258657 | A1 | 10/2011 | Casilao et al. | |
| 2012/0185393 | A1 | 7/2012 | Atsmon et al. | |
| 2017/0173262 | A1* | 6/2017 | Veltz | G16H 20/17 |
| 2018/0082043 | A1* | 3/2018 | Witchey | G16H 10/40 |
| 2019/0361917 | A1 | 11/2019 | Tran et al. | |
| 2020/0084027 | A1* | 3/2020 | Duchon | G06F 21/602 |
| 2020/0251213 | A1* | 8/2020 | Tran | G06N 20/00 |
| 2020/0266984 | A1* | 8/2020 | Endress | H04L 63/20 |
| 2020/0348662 | A1* | 11/2020 | Cella | G05B 19/41865 |
| 2020/0389462 | A1* | 12/2020 | Murdoch | H04L 9/3239 |
| 2022/0272128 | A1* | 8/2022 | Babaei | H04L 9/50 |
| 2022/0414237 | A1* | 12/2022 | Lally | G06N 20/00 |
| 2023/0198764 | A1* | 6/2023 | Panicker | H04L 9/3271 |
| | | | | 713/168 |

* cited by examiner

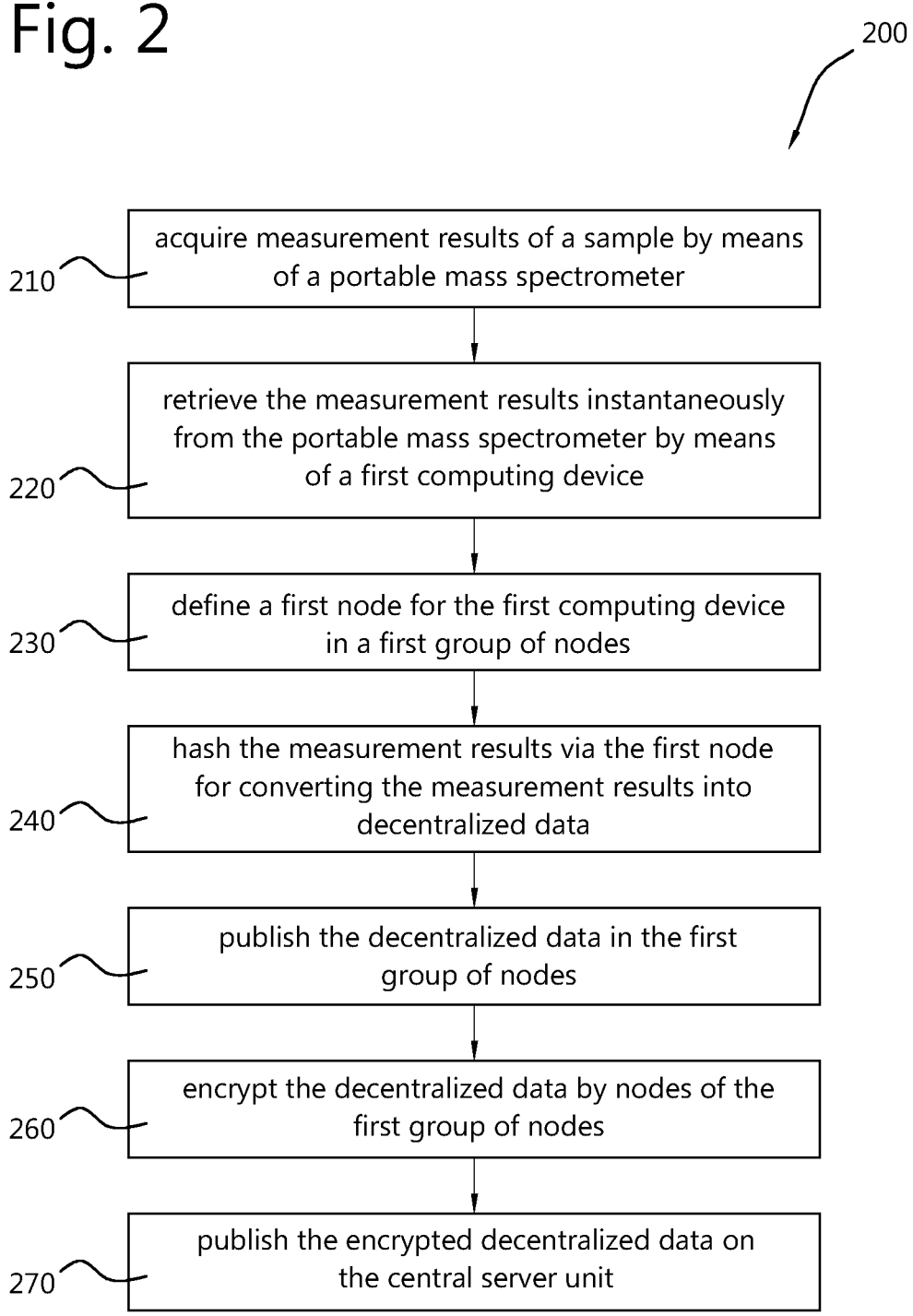

MASS SPECTROMETRY DATA MANAGEMENT SYSTEM AND METHOD

FIELD OF THE INVENTION

The present invention relates to a portable mass spectrometer data assessment system. The invention also relates to a method of building a cloud-based mass spectrometer database for protecting measurement results and reading the measurement results therefrom, by using the portable mass spectrometer data assessment unit.

BACKGROUND OF THE INVENTION

Ensuring food safety depends on the monitoring of contaminants (e.g. pesticides, toxins, bacteria and antibiotics), and the reliability of data collected along a supply chain. Supply chain networks around business transactions tend to be complex, as the supply chain networks are designed to address a multitude of business activities between disparate partners or suppliers.

A typical supply chain network for a large company needs to deal with potentially thousands of nodes of suppliers and partners, the number of which may increase or decrease dynamically as different suppliers or partners are brought in or leave the system. These suppliers and partners are partially managed through disparate in-house systems, human beings, meetings, calls, etc.

Today, this monitoring is done in laboratories (external and internal), which is expensive and consumes a lot of time. Even if the laboratory acts as a centralizing party by hosting the supply chain network that gets and sends result data to and from all the parties that are involved, errors can be inadvertently inserted in these point to point transactions through transcription errors, or can be lost entirely.

This approach has also challenges with respect to the logistics. There are cases when contaminated or bad quality food is already in the supermarket by the time results are available from measurements involving the use of a mass spectrometer. The fipronil egg scandal and the salmonella baby milk scandal are prime examples of said challenges associated with current approaches. Among the food scandals that are reported, approximately 99% of them cannot be traced back to the source origin.

Blockchain systems have been proposed that might provide partial solutions to the above problems, but they are insufficient. While current blockchain implementations can be used to record the custody of a product (or parts of a product) for supply chain purposes, they cannot provide real time updates as the product is analyzed in a mass spectrometer. Usually, in the laboratories where the product is tested, the analyzed data for the product are uploaded on a block chain by a user. This can lead to tampered and delayed data problems.

SUMMARY OF THE INVENTION

It is an objective of the present invention to provide a portable mass spectrometer data assessment system and a method of building a cloud-based mass spectrometer database, the system and method being suitable to provide an improved supply chain network for enabling an improved and real time data transferring algorithm, and improved reliability.

Aspects of the present invention are set out in the accompanying independent and dependent claims. Features from the dependent claims may be combined with features from the independent claim as appropriate and not merely as explicitly set out in the claims.

In view of the foregoing, the invention provides a portable mass spectrometer data assessment system comprising:
a portable mass spectrometer that is configured to acquire measurement results of a sample,
a first computing device that is connected to the portable mass spectrometer for retrieving the measurement results from the portable mass spectrometer in real time, wherein the first computing device defines a first node in a first group of nodes when the first computing device is connected to the internet, wherein the first node is configured to hash the measurement results for converting the measurement results into decentralized data, wherein the first node is configured to publish the decentralized data in the first group of nodes, and wherein the first group of nodes is configured to encrypt the decentralized data, and
a central server unit that is connected to the first group of nodes through the internet, wherein the first group of nodes is configured to publish the decentralized data in the central server unit instantaneously.

The portable mass spectrometer may be physically connected to the first computing device. The first computing device may scan the measurement results immediately. Every measurement result from the portable mass spectrometer can be saved on the central server unit via the first computing device in real time. In that way, said measurement results can be used for future analysis and/or references, in a tamper-proof manner.

The measurement results may be received from one or more nodes in the first group of nodes on the central server unit. For example, the measurement results may be transferred from one or more portable mass spectrometers to the first computing device. Additionally, one or more first computing devices may be connected to the one or more portable mass spectrometers. The first computing device may be selected from a group that includes computing devices such as tablet, computer, smart phone, etc.

The first group of nodes may define a blockchain network and the data assessment system may be adapted to provide real-time updates and predictive functionality in a distribution chain of the product. The measurement results are encrypted on the distribution storage unit, thereby providing the decentralized data for the distribution chain. The decentralized data may include a quality assessment of the products. In that way, the system may be adapted to provide an analysis for finding any contaminants in the product. The system may generate warning notifications accordingly.

The encrypted decentralized data may be uploaded from a portable device directly to the central server unit. The decentralized data may include every type of test details (date, device, location, and other details) that is provided from the portable mass spectrometer. The central server unit may include a database that includes said test details of the decentralized data. The decentralized data may be cross checked with the first group of nodes to ensure its authenticity.

Said database of the central server unit may be an SQL based database which will store the result parameters for further processing of the decentralized data. Accordingly, the central server unit may further include a processing and presentation module that takes care of the processing and presentation of the decentralized data taken from the SQL based database of the central server unit. It will also perform data authenticity checks with the first group of nodes before the decentralized data being processed.

In an embodiment of the system according to the invention, the first node of the first group of nodes is configured to encrypt the decentralized data in the first group of nodes.

The first group of nodes may define a distributed ledger network in central server unit. The first node of the first group of nodes may be adapted to run a blockchain node of the distributed ledger network to log the hashed value (the decentralized data) of the measurement result file directly to the distributed ledger network. Subsequently, the first node may also encrypt the decentralized data and upload the encrypted decentralized data to the central server unit along with the transaction hash of the distributed ledger network.

The first node of the first group of nodes may have an API (application programming interface) library module to enable communication between the portable mass spectrometer and the central server unit. Said module may define functions/methods in the library of the central server unit.

In an embodiment of the system according to the invention, a second node in the first group of nodes, which is connected to the first node, is configured to encrypt the decentralized data in the central server unit.

The first group of nodes may consist of the different nodes connected to each other. These nodes can be located in the computers/servers of interested parties. The first node which is connected to the portable mass spectrometer for retrieving the measurement results from the portable mass spectrometer in real time is configured to hash the measurement results for converting the measurement results into the decentralized data and upload the encrypted decentralized data to the central server unit. The second node that is connected to the first node in the first group of nodes may also encrypt the decentralized data in the central server unit.

In an embodiment of the system according to the invention, the data assessment system comprises a second computing device that is configured to provide the decentralized data to a user, wherein the second computing device defines a node in a second group of nodes on the central server unit when the second computing device is connected to the central server unit.

The second group of nodes may include various nodes that are defined by various users in the distribution chain. Each of the second group of nodes may be defined by any number of suppliers (e.g., vendor, plant, etc. involved with component construction, merging of components, etc.) that may be enabled as nodes in the second group of nodes on the system. The system may also include any number of partners as well (e.g., distributors, shippers, retailers, third party logistics providers, etc.), which may also be enabled as nodes in the second group of nodes on the system. Each node in the second group of nodes may transfer the decentralized data between each other.

The second group of nodes may define a distributed file storage system that is configured to store the decentralized data in the different nodes. The encrypted decentralized data may be uploaded into the distributed file storage system. The decentralized data may be decrypted, and data points (each reading in the decentralized data) are updated in the database of the central server unit.

In an embodiment of the system according to the invention, the central server unit is configured to determine whether or not the node defined by the second computing device is authorized to access at least a part of the decentralized data on the basis of predetermined information on the central server unit specifying a level of access rights of nodes in the second group of nodes.

Suppliers and partners that are defined as physical or virtual nodes in the second group of nodes on the distribution chain (such as a blockchain), and each node can be subject to a set of rules and policies based on the role they play in the business. The rules and policies are, for example, described and executed through the predetermined information. The predetermined information may be defined as virtual contracts. The user may be granted access to the decentralized data with a set of rules and policies as defined in the predetermined information. The users involved in the distribution chain of the product as a node may be assigned tasks to perform, whether the tasks are viewing the decentralized data, quality assessment the product according to the decentralized data, or sending the decentralized data between the nodes of the second group of nodes.

The system may be used and run by one organization or entity, which can manage security and control authorization for each node on the distribution chain in addition to managing business rules and policies with the predetermined information. For example, the organization may grant a first node in the second group of nodes access to only a portion of some data on the distribution chain, so that information from another node (who may be a competitor of the first node) in the distribution chain may be kept private from the first node. The organization may even keep some information private from all nodes in the second group of nodes. However, one of skill in the art will understand that any architecture that supports a chain of custody of individual components can be used to the same effect.

In an embodiment of the system according to the invention, the central server unit is configured to determine whether or not the node defined by the second computing device is authorized to access at least a part of the decentralized data on the basis of predetermined information on the central server unit specifying a level of access rights of nodes in the second group of nodes.

In an embodiment of the system according to the invention, the central server unit is configured to grant to the node defined by the second computing device a first level of access to the decentralized data when the node is determined to be authorized to access at least a part of the decentralized data, the first level of access including read access for a part of the decentralized data.

In an exemplary embodiment, the central server unit may be configured to grant to the node defined by the second computing device a second level of access to the decentralized data when the node is determined to be authorized to access at least a part of the decentralized data. The second level of access may include a read access for all of the decentralized data.

Each node in the second group of nodes may include functionality to read and/or access to the decentralized data. A user may also access to the decentralized data on the node in the second group of nodes via a user interface that is defined on the second computing device. The user may be subject to certain rules, policies, and restrictions set by the predetermined information. For example, a customer may only be granted read access to a portion of the data on the central server unit so that sensitive internal business data is not made public.

Each node in the second group of nodes may be configured to perform a deep level examination and valuation of the decentralized data, and the findings may be stored and/or presented by said nodes in the second group of nodes. The second group of nodes may be configured to do the following:

Checking the presence of the chemicals of the sample that should be monitored in the decentralized data. (Each company may select the chemicals that should be monitored form the dashboard)

Initiate notifications to concerned parties in case the chemicals in the monitor list are present according to the alert preferences of the end users.

Comparing the decentralized data with the previous test results and creating the changing pattern (in case of food sample testing).

Creating quality predictions using Artificial intelligence.

Creating quality trends of the sample sources. The improvements of the sample source in terms of quality may be shown based on the test result history.

Some nodes in the second group of nodes which are authorized to access the web portal connected to the central server may search for a particular chemical or reading. This search may take place in 2 methods, as follows:

1. Checking the database of the central server unit for the search matching criteria and showing the result. This is quick and without any authenticity checks, so this may be used in situations where the data authenticity is not critical.
2. Extracting the result after checking the authenticity, which is more complex and time-consuming. In such a case,
   a. Tests matching the search criteria will get identified,
   b. Result files of the above-identified test are fetched from the second group of nodes or from the central server unit itself,
   c. Verification is performed of result files authenticity from blockchain,
   d. Result files are decrypted and re-updated in the database of the central server unit, and
   e. SQL queries are executed to find the match.

In an embodiment of the system according to the invention, the first computing device comprises a processor connected to the portable mass spectrometer, which is configured to process the measurement results before uploading on the central server unit, wherein the processor defines a second node in the first group of nodes when the processor is connected to the internet and the portable mass spectrometer.

A second computing device which defines the second node in the first group of nodes may have the processor which can be uploaded to the second computing device as an application or computer program. Said processor may be configured to analyze and/or process the raw measurement results before publishing them in the central server unit. Said processor may be selected in a group that includes Matlab, Python, and etc.

According to another aspect of the present invention, a method of building a cloud-based portable mass spectrometer database for protecting measurement results and reading the measurement results therefrom by using the portable mass spectrometer data assessment system, the method comprising:

acquiring measurement results of a sample by means of a portable mass spectrometer;

retrieving the measurement results instantaneously from the portable mass spectrometer by means of a first computing device;

defining a first node for the first computing device in a first group of nodes;

hashing the measurement results via the first node for converting the measurement results into decentralized data;

publishing the decentralized data in the first group of nodes;

encrypting the decentralized data by nodes of the first group of nodes; and publishing the encrypted decentralized data on the central server unit.

In an embodiment of the method according to the invention, the method further comprises encrypting the decentralized data via the first node in the first group of nodes.

In an embodiment of the method according to the invention, the method further comprises providing the decentralized data to a user by means of a second computing device, wherein the second computing device defines a node in a second group of nodes on the central server unit.

In an embodiment of the method according to the invention, the method further comprises determining whether or not the node defined by the second computing device is authorized to access at least a part of the decentralized data on the basis of predetermined information on the central server unit specifying a level of access rights of nodes in the second group of nodes.

In an embodiment of the method according to the invention, the predetermined information is adapted to specify a level of access rights of nodes in the second group of nodes.

In an embodiment of the method according to the invention, the method further comprises granting to the node defined by the second computing device a first level of access to the decentralized data when the node is determined to be authorized to access at least a part of the decentralized data, wherein the first level of access includes at least a read access for all of the decentralized data.

In an embodiment of the method according to the invention, the method further comprises granting to the node defined by the second computing device a second level of access to the decentralized data when the node is determined to be authorized to access at least a part of the decentralized data, wherein the second level of access includes read access for a part of the decentralized data.

It can be understood that the embodiments of the method according to the invention may relate to use of a portable mass spectrometer data assessment system having any of the features or combinations of features that are disclosed herein in connection with discussions of the portable mass spectrometer data assessment system according to the invention. Accordingly, the aspects of the earlier discussions of the portable mass spectrometer data assessment system are hereby incorporated into this discussion of the examples of the method.

BRIEF DESCRIPTION OF THE DRAWINGS

Further features and advantages of the invention will become apparent from the description of the invention by way of exemplary and non-limiting embodiments of a portable mass spectrometer data assessment system.

The person skilled in the art will appreciate that the described embodiments of the system according to the present invention are exemplary in nature only and not to be construed as limiting the scope of protection in any way. The person skilled in the art will realize that alternatives and equivalent embodiments of the object can be conceived and reduced to practice without departing from the scope of protection of the present invention.

Reference will be made to the figures on the accompanying drawing sheets. The figures are schematic in nature and therefore not necessarily drawn to scale. Further, equal reference numerals denote equal or similar parts. On the attached drawing sheets, FIG. 2 illustrates a flow chart of a method of building a cloud-based portable mass spectrometer database in accordance with another embodiment of the invention.

DETAILED DESCRIPTION OF EMBODIMENTS

Figure 1:
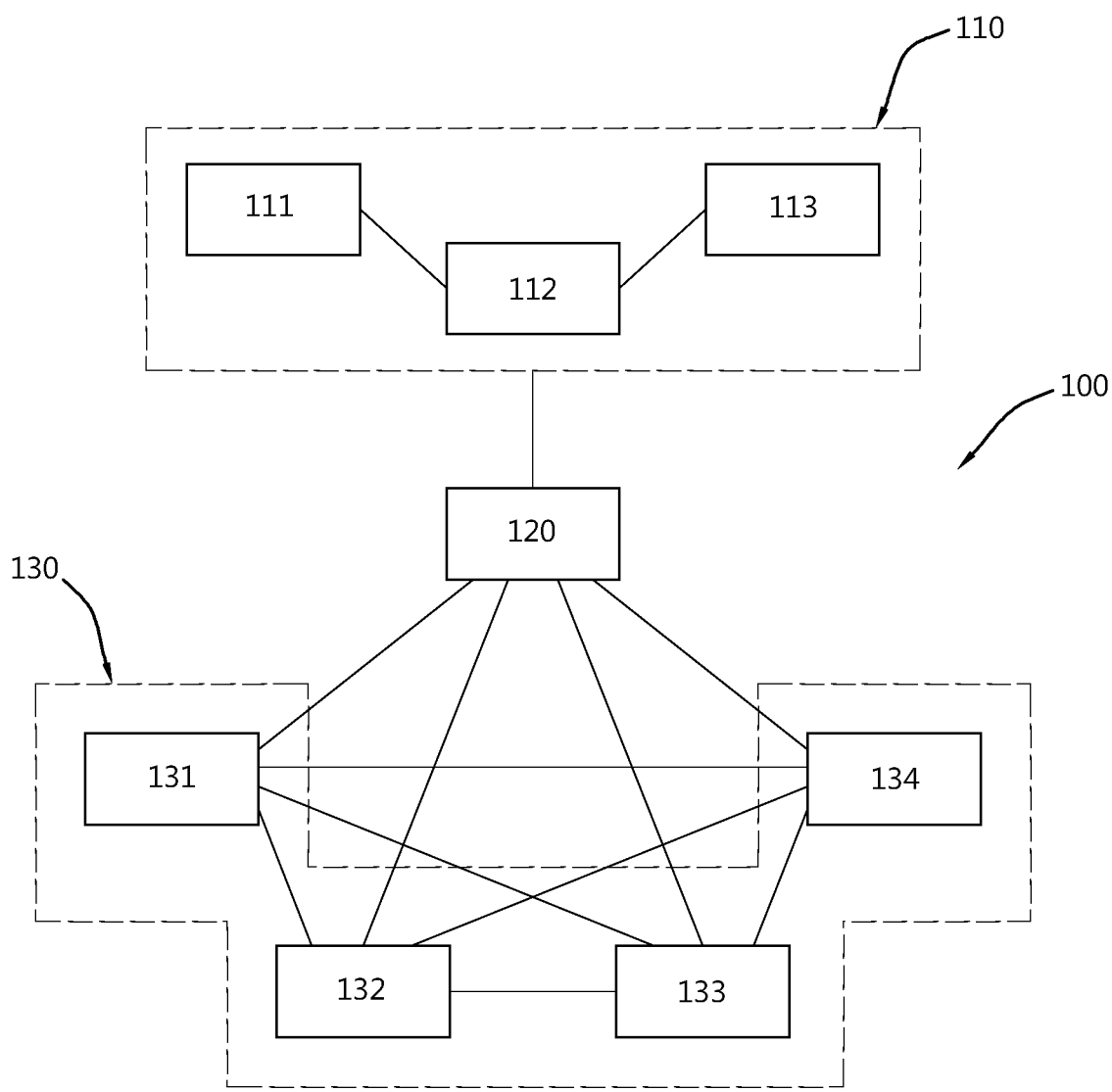
FIG. 1 illustrates a schematic block diagram of a portable mass spectrometer data assessment system in accordance with an embodiment of the invention.

FIG. 1 is a block diagram illustrating an exemplary a portable mass spectrometer data assessment system 100 according to an embodiment of the present invention. The portable mass spectrometer data assessment system 100 comprises a portable mass spectrometer 111 that is configured to acquire measurement results of a sample, a first computing device 112 that is connected to the portable mass spectrometer 111, and a central server unit 120.

The first computing device 112 is configured to retrieve the measurement results from the portable mass spectrometer 111 in real time. The first computing device 112 defines a first node in a first group of nodes 110 when the first computing device 112 is connected to the internet 113. Said first node is configured to hash the measurement results for converting the measurement results into decentralized data. The first node defined by the first computing device 112 is configured to publish the decentralized data in the first group of nodes 110.

Optionally, the first computing device 112 as the first node is configured to encrypt the decentralized data to encrypt the decentralized data in the first group of nodes 110.

The first group of nodes 110 may define a distributed ledger network in central server unit 120. First node of the first group of nodes 110 may be adapted run a blockchain node of the distributed ledger network to log the hashed value (the decentralized data) of the measurement result file directly to the distributed ledger network (the first group of nodes 110). Subsequently, the first node may also encrypt the decentralized data and upload the encrypted decentralized data to the central server unit 120.

As shown in FIG. 1, the portable mass spectrometer 111 may be physically connected to the first computing device 112. The first computing device 112 may scan the measurement results immediately. Every measurement result from the portable mass spectrometer 111 can be saved on the central server unit 120 via the first computing device 112 in real time. In that way, said measurement results can be used for future analysis and/or references, in a tamper-proof manner.

The central server unit 120 is connected to the first group of nodes 110 through the internet 113. The first group of nodes 110 is configured to publish the decentralized data in the central server unit 120 instantaneously.

The first group of nodes 110 may consist of the different nodes connected to each other. These nodes can be located in the computers/servers of interested parties. The first node which is connected to the portable mass spectrometer 111 for retrieving the measurement results from the portable mass spectrometer 111 in real time is configured to hash the measurement results for converting the measurement results into the decentralized data and upload the encrypted decentralized data to the central server unit 120. Optionally, a second node that is connected to the first node in the first group of nodes 110 may also encrypt the decentralized data in the central server unit (120).

The measurement results may be received from one or more nodes in the first group of nodes 110 on the central server unit 120. For example, the measurement results may be transferred from one or more portable mass spectrometers 111 to the first computing device 112. Additionally, one or more first computing devices 112 may be connected to the one or more portable mass spectrometers 111. The first computing device 112 may be selected from a group that includes computing devices such as tablet, computer, smart phone, etc.

As shown in FIG. 1, the system 100 may comprise a second group of nodes 130 that includes nodes 131, 132, 133, 134. Said nodes 131, 132, 133, 134 may be selected from a group that includes computing devices such as tablet, computer, smart phone, etc. A second computing device may be one of the nodes 131, 132, 133, 134. Each of the nodes 131, 132, 133, 134 is configured to provide the decentralized data to a user when the second group of nodes 130 is connected to the central server unit 120.

Optionally, the central server unit 120 is configured to determine whether or not the node 131, 132, 133, 134 defined by the second computing device is authorized to access at least a part of the decentralized data on the basis of predetermined information on the central server unit 120 specifying a level of access rights of nodes in the second group of nodes 130. Accordingly, the central server unit 120 may grant to each of the nodes 131, 132, 133, 134 a first level of access to the decentralized data when the each of the nodes 131, 132, 133, 134 are determined to be authorized to access at least a part of the decentralized data. The first level of access includes at least a read access for a part of the decentralized data or all of the decentralized data.

FIG. 2 is a flow chart of a method showing an example 200 of building a cloud-based portable mass spectrometer database. The example 200 of the process starts at step 210. Step 210 of the method 200 includes acquiring measurement results of a sample by means of a portable mass spectrometer 111. Step 220 of the method 200 includes retrieving the measurement results instantaneously from the portable mass spectrometer 111 by means of a first computing device 112. Step 230 of the method 200 includes defining a first node for the first computing device 112 in a first group of nodes 110. Step 240 of the method 200 includes hashing the measurement results via the first node for converting the measurement results into decentralized data. Step 250 of the method 200 includes publishing the decentralized data in the first group of nodes 110. Step 260 of the method 200 includes encrypting the decentralized data by nodes of the first group of nodes 110. Step 270 of the method 200 includes publishing the encrypted decentralized data on the central server unit 120. The method 200 may then end at step 270.

Optionally, step 270 may include encrypting the decentralized data via the first node in the first group of nodes 110.

Optionally, step 270 may further include encrypting the decentralized data via a second node in the first group of nodes 110, which is connected to the first node.

Optionally, step 270 may further include providing the decentralized data to a user by means of a second computing device, wherein the second computing device defines a node 131, 132, 133, 134 in a second group of nodes 130 on the central server unit 120.

Optionally, step 270 may further include determining whether or not the node defined by the second computing device is authorized to access at least a part of the decentralized data on the basis of predetermined information on the central server unit 120 specifying a level of access rights of nodes 131, 132, 133, 134 in the second group of nodes 130.

Optionally, step 270 may further include granting to the nodes 131, 132, 133, 134 defined by the second computing device a first level of access to the decentralized data when the node 131, 132, 133, 134 is determined to be authorized to access at least a part of the decentralized data, wherein the first level of access includes at least a read access for all of the decentralized data.

Optionally, step 270 may further include granting to the nodes 131, 132, 133, 134 defined by the second computing device a second level of access to the decentralized data when the node 131, 132, 133, 134 is determined to be authorized to access at least a part of the decentralized data, wherein the second level of access includes read access for a part of the decentralized data.

It is understood that steps 210, 220, 230, 240, 250, 260, and 270 of the method 200 may relate to use of a portable mass spectrometer data assessment system having any of the features or combinations of features that are disclosed herein in connection with discussions of the portable mass spectrometer data assessment system 100. Accordingly, the disclosure of FIG. 1 and all aspects of the earlier discussions of the portable mass spectrometer data assessment system 100 are hereby incorporated into the present discussion of the examples of the method 200.

The present invention can be summarized as relating to a portable mass spectrometer data assessment system 100 comprising a portable mass spectrometer 111 that is configured to acquire measurement results of a sample, a first computing device 112 that is connected to the portable mass spectrometer 111 for retrieving the measurement results from the portable mass spectrometer 111 in real time, and a central server unit 120 that is connected to a first group of nodes 110 through the internet 113. The first computing device 112 defines a first node in the first group of nodes 110 when the first computing device 112 is connected to the internet 113. The first node is configured to hash the measurement results for converting the measurement results into decentralized data. The first node is configured to publish the decentralized data in the first group of nodes 110. The first group of nodes 110 is configured to publish the decentralized data in the central server unit 120 instantaneously.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage.

Any reference numerals in the claims should not be construed as limiting the scope of the present invention.

REFERENCE LIST

100 System
110 First group of nodes
111 Portable mass spectrometer
112 First computing device
113 Internet
120 Central server unit
130 Second group of nodes
131, 132, 133, 134 Nodes

The invention claimed is:

1. A portable mass spectrometer data assessment system to prevent tampering with measurement results of a product sample, comprising:
   a portable mass spectrometer that is configured to analyze the sample by acquiring measurement results of the sample, wherein the measurement results include a chemical composition, presence of a chemical, or contaminant in the sample,
   a first computing device that is connected to the portable mass spectrometer for retrieving the measurement results from the portable mass spectrometer in real time, wherein the first computing device defines a first node in a first group of nodes when the first computing device is connected to the internet, wherein the first node is configured to hash the measurement results for converting the measurement results into decentralized data, wherein the first node is configured to publish the decentralized data in the first group of nodes, and wherein the first group of nodes is configured to encrypt the decentralized data, and
   a central server unit that is connected to the first group of nodes through the internet, wherein the first group of nodes is configured to publish the decentralized data in the central server unit instantaneously, and wherein the central server unit is configured to save the decentralized data in real time.

2. The data assessment system according to claim 1, wherein the first node of the first group of nodes is configured to encrypt the decentralized data in the first group of nodes.

3. The data assessment system according to claim 2, wherein the central server unit is configured to determine whether or not the node defined by the second computing device is authorized to access at least a part of the decentralized data on the basis of predetermined information on the central server unit specifying a level of access rights of nodes in the second group of nodes.

4. The data assessment system according to claim 1, wherein a second node in the first group of nodes, which is connected to the first node, is configured to encrypt the decentralized data in the central sever unit.

5. The data assessment system according to claim 4, wherein the central server is configured to grant to the node defined by the second computing device a first level of access to the decentralized data when the node is determined to be authorized to access at least a part of the decentralized data, the first level of access including read access for a part of the decentralized data.

6. The data assessment system according to claim 1, further comprising:
   a second computing device that is configured to provide the decentralized data to a user, wherein the second computing device defines a node in a second group of nodes on the central server unit when the second computing device is connected to the central server unit.

7. The data assessment system according to claim 6, wherein the second group of nodes is configured to:
check the presence of the chemical or contaminant in the sample in the decentralized data;
comparing the decentralized data with previous test results and creating a changing pattern based thereon in case the sample is a food sample;
creating quality predictions using artificial intelligence; or
creating quality trends of sample sources.

8. The data assessment system according to claim 1, wherein the first computing device comprises a processor connected to the portable mass spectrometer, which is configured to process the measurement results before uploading on the central server unit, and wherein the processor defines a second node in the first group of nodes when the processor is connected to the internet and the portable mass spectrometer.

9. The data assessment system according to claim 1, wherein the decentralized data includes a quality assessment of the sample based on the presence of the chemical or contaminant in the sample.

10. A method of building a cloud-based portable mass spectrometer database for protecting measurement results of a product sample and reading the measurement results therefrom by using the portable mass spectrometer data assessment system according to claim 1, the method comprising the steps of:
analyzing the sample by acquiring measurement results of the sample by means of a portable mass spectrometer, wherein the measurement results include a chemical composition, a presence of a chemical or contaminant in the sample;
retrieving the measurement results in real time from the portable mass spectrometer by means of a first computing device;
defining a first node for the first computing device in a first group of nodes;
hashing the measurement results via the first node for converting the measurement results into decentralized data;
publishing the decentralized data in the first group of nodes;
encrypting the decentralized data by nodes of the first group of nodes;
publishing the encrypted decentralized data on the central server unit instantaneously; and
saving the decentralized data on the central server unit in real time.

11. The method according to claim 10, further comprising:
encrypting the decentralized data via the first node in the first group of nodes.

12. The method according to claim 10, further comprising:
encrypting the decentralized data via a second node in the first group of nodes, which is connected to the first node.

13. The method according to claim 12, further comprising:
providing the decentralized data to a user by means of a second computing device, wherein the second computing device defines a node in a second group of nodes on the central server unit.

14. The method according to claim 13, the method further comprising, by the second group of nodes:
checking the presence of the chemical or contaminant in the sample in the decentralized data;
comparing the decentralized data with previous test results and creating a changing pattern based thereon in case the sample is a food sample;
creating quality predictions using artificial intelligence; or
creating quality trends of sample sources.

15. The method according to claim 13, further comprising:
determining whether or not the node defined by the second computing device is authorized to access at least a part of the decentralized data on the basis of predetermined information on the central server unit specifying a level of access rights of nodes in the second group of nodes.

16. The method according to claim 15, wherein the predetermined information is adapted to specify a level of access rights of nodes in the second group of nodes.

17. The method according to claim 15, further comprising:
granting to the node defined by the second computing device a first level of access to the decentralized data when the node is determined to be authorized to access at least a part of the decentralized data, wherein the first level of access includes at least a read access for all of the decentralized data.

18. The method according to claim 15, further comprising:
granting to the node defined by the second computing device a second level of access to the decentralized data when the node is determined to be authorized to access at least a part of the decentralized data, wherein the second level of access includes read access for a part of the decentralized data.

19. The method according to claim 10, wherein the decentralized data includes a quality assessment of the sample based on the presence of the chemical or contaminant in the sample.

* * * * *